United States Patent
Tani (10) Patent No.: US 11,833,884 B2
(45) Date of Patent: Dec. 5, 2023

(54) HEAT EXCHANGE SYSTEM FOR VEHICLE AND AIR CONDITIONING SYSTEM FOR VEHICLE

(71) Applicant: Mitsubishi Electric Corporation, Tokyo (JP)

(72) Inventor: Masakazu Tani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 16/981,770

(22) PCT Filed: Apr. 20, 2018

(86) PCT No.: PCT/JP2018/016284
§ 371 (c)(1),
(2) Date: Sep. 17, 2020

(87) PCT Pub. No.: WO2019/202731
PCT Pub. Date: Oct. 24, 2019

(65) Prior Publication Data
US 2021/0008962 A1    Jan. 14, 2021

(51) Int. Cl.
*B60H 1/00* (2006.01)
*B60H 1/03* (2006.01)
*F24F 7/007* (2006.01)

(52) U.S. Cl.
CPC ......... *B60H 1/00921* (2013.01); *B60H 1/039* (2019.05); *B60H 1/00392* (2013.01);
(Continued)

(58) Field of Classification Search
CPC .............. B60H 1/00921; B60H 1/039; B60H 1/00392; B60L 2240/36; F24F 7/007; F25B 2700/2106
See application file for complete search history.

(56) References Cited

U.S. PATENT DOCUMENTS

| | | | |
|---|---|---|---|
| 5,507,153 A * | 4/1996 | Seto .................. | B60H 1/00492 62/133 |
| 2009/0282840 A1* | 11/2009 | Chen .................. | F25J 1/0012 60/671 |

(Continued)

FOREIGN PATENT DOCUMENTS

| JP | 62-123237 A | 6/1987 |
|---|---|---|
| JP | 07-223538 A | 8/1995 |

(Continued)

OTHER PUBLICATIONS

Calculator Definition & Meaning—Merriam-Webster, https://www.merriam-webster.com/dictionary/calculator, 2023 (Year: 2023).*

(Continued)

*Primary Examiner* — Henry T Crenshaw
(74) *Attorney, Agent, or Firm* — Sughrue Mion, PLLC; Richard C. Turner (57) ABSTRACT

It provides an operation part calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a control part controlling at least one of the air blower for absorption and the air blower for discharge so that the energy consumed by the air blower for absorption and the air blower for discharge becomes small when the operation part determines that the energy consumed by the air blower for absorption and the air blower for discharge is greater than the energy recovered by the heat exchanger.

10 Claims, 3 Drawing Sheets

(52) U.S. Cl.
CPC ........... *B60L 2240/36* (2013.01); *F24F 7/007* (2013.01); *F25B 2700/2106* (2013.01)

(56) References Cited

U.S. PATENT DOCUMENTS

| | | | | |
|---|---|---|---|---|
| 2017/0355247 | A1* | 12/2017 | Seki | ........................ B60H 1/323 |
| 2018/0126820 | A1* | 5/2018 | Makimoto | ......... B60H 1/00778 |
| 2018/0251009 | A1* | 9/2018 | Fujii | ................... B60H 1/00735 |
| 2018/0312029 | A1* | 11/2018 | Ito | ....................... B60H 1/00064 |
| 2019/0039433 | A1* | 2/2019 | Wakisaka | ........... B60H 1/00892 |
| 2020/0031197 | A1* | 1/2020 | Ryu | ................... B60H 1/00007 |
| 2021/0008962 | A1* | 1/2021 | Tani | ................... B60H 1/00921 |

FOREIGN PATENT DOCUMENTS

| | | | |
|---|---|---|---|
| JP | 2010-076506 | A | 4/2010 |
| JP | 2012-001037 | A | 1/2012 |
| JP | 2012-171522 | A | 9/2012 |
| JP | 2012171522 | A * | 9/2012 |
| JP | 2013-189043 | A | 9/2013 |
| JP | 5640484 | B2 | 12/2014 |
| JP | 2015-028391 | A | 2/2015 |
| JP | 2015028391 | A * | 2/2015 |
| JP | 2017058993 | A | 3/2017 |

OTHER PUBLICATIONS

Fujimoto, Air conditioning system, Feb. 2015Feb. 2012, JP-2015028391-A, machine translation (Year: 2015).*

Extended European Search Report dated Dec. 10, 2021, issued by the European Patent Office in application No. 18915294.5.

Communication dated May 25, 2021 from the Japanese Patent Office in Application No. 2020-514888.

International Search Report for PCT/JP2018/016284 dated Jul. 17, 2018 [PCT/ISA/210].

Communication dated Sep. 21, 2021, from the Japanese Patent office in application No. 2020-514888.

Office Action dated Mar. 31, 2023 in Chinese Application No. 201880092438.3.

* cited by examiner

HEAT EXCHANGE SYSTEM FOR VEHICLE AND AIR CONDITIONING SYSTEM FOR VEHICLE

CROSS REFERENCE TO RELATED APPLICATIONS

This application is a National Stage of International Application No. PCT/JP2018/016284 filed Apr. 20, 2018.

TECHNICAL FIELD

The present application relates to a heat exchange system for vehicle and an air conditioning system for vehicle installed in a vehicle, for example, the present invention relates to a heat exchange system for vehicle and an air conditioning system for vehicle that is particularly effective when applied to electric vehicles such as plug-in hybrid vehicles and electric vehicles.

BACKGROUND ART

In an air conditioning system for vehicle, heat loss due to vehicle ventilation is large, so the electrical energy consumption of air conditioning during heating and cooling is large, it is an issue for electric vehicles to significantly reduce the electricity cost during air conditioning.

In order to reduce the heat loss due to the ventilation of the vehicle, in a conventional air conditioner for vehicle, before the air inside the vehicle is discharged to the outside of the vehicle, in some cases, a crossflow heat exchanger is used to exchange heat with the air intaken into the vehicle compartment from the outside. (See Patent Literature 1)
[Patent Literature 1] JP 5640484 B2

DISCLOSURE OF INVENTION

Technical Problem

In the conventional air conditioning system for vehicle, under a condition where there is a large difference in temperature and humidity between the air outside the vehicle intaken into the cabin (simply called "outside air") and the air inside the vehicle exhausted outside the vehicle (simply called "exhaust air"), since the energy that can be recovered from the exhausted "exhaust air" to the intaken "outside air" by the temperature and humidity exchange function in the temperature and humidity exchanger inside the vehicle is greater than the energy consumed by the air blower that exhausts the "exhaust air" and the air blower that intakes the "outside air", it contributes to the improvement of the electric costs. However, under the condition that the temperature-humidity difference between the "outside air" and the "exhaust air" is small, according to the energy that can be recovered from the "exhaust" by the temperature and humidity exchanger, since the energy consumed by the air blower increases, it is thought that the electricity cost will worsen conversely.

Therefore, it is preferable to prevent or suppress the worsening of electric costs due to the difference in temperature and humidity between the "outside air" and the "exhaust air".

The present application discloses the technology made in view of the above-mentioned situation, and it is an object of the present invention to prevent or suppress worsening of electric costs due to the temperature and humidity difference or the temperature difference between the air outside the vehicle intaken inside the vehicle and the air inside the vehicle discharged outside the vehicle.

Solution to Problem

The heat exchange system for vehicle as disclosed in the present application provides
a heat exchanger that exchanges heat between the air inside the vehicle and the air outside the vehicle,
an air blower for absorption that intakes the air outside the vehicle inside the vehicle and feeds it to the heat exchanger,
an air blower for discharge that exhausts an air after the heat exchange between an air inside the vehicle and the air outside the vehicle, which is fed by the air blower for absorption, to the outside of the vehicle, and
a control device having an operation part calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a control part controlling at least one of the air blower for absorption and the air blower so that the energy consumed by the air blower for absorption and the air blower for discharge becomes small when the operation part determines that the energy consumed by the air blower for absorption and the air blower for discharge is greater than the energy recovered by the heat exchanger.

The air conditioning system for vehicle as disclosed in the present application provides
a heat exchanger that exchanges heat between the air inside the vehicle and the air outside the vehicle,
an air blower for absorption that intakes the air outside the vehicle inside the vehicle and feeds it to the heat exchanger,
an air blower for discharge that exhausts an air after the heat exchange between an air inside the vehicle and the air outside the vehicle, which is fed by the air blower for absorption, to the outside of the vehicle, and
a control device having an operation part calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a control part controlling at least one of the air blower for absorption and the air blower so that the energy consumed by the air blower for absorption and the air blower for discharge becomes small when the operation part determines that the energy consumed by the air blower for absorption and the air blower for discharge is greater than the energy recovered by the heat exchanger,
and provides a heat pump system providing air conditioning inside the vehicle.

Advantageous Effects of Invention

According to the heat exchange system for vehicles disclosed in the present invention, as it provides an operation part calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a control part controlling at least one of the air blower for absorption and the air blower so that the energy consumed by the air blower for absorption and the air blower for discharge becomes small when the operation part determines that the energy consumed by the air blower for absorption and the air blower for discharge is greater than the energy recovered by the heat exchanger, it is possible to prevent or control the worsening of electricity costs due to temperature and humidity differences between the air outside the vehicle, which is intaken inside the vehicle, and the air inside the vehicle, which is exhausted outside the vehicle.

According to the air conditioning system for vehicle disclosed in the present invention, as it provides an operation part calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a control part controlling at least one of the air blower for absorption and the air blower so that the energy consumed by the air blower for absorption and the air blower for discharge becomes small when the operation part determines that the energy consumed by the air blower for absorption and the air blower for discharge is greater than the energy recovered by the heat exchanger and a heat pump system providing air conditioning inside the vehicle, it is possible to prevent or control the worsening of electricity costs due to temperature and humidity differences between the air outside the vehicle, which is intaken inside the vehicle, and the air inside the vehicle, which is exhausted outside the vehicle.

DESCRIPTION OF EMBODIMENTS

First Embodiment

Figure 1:
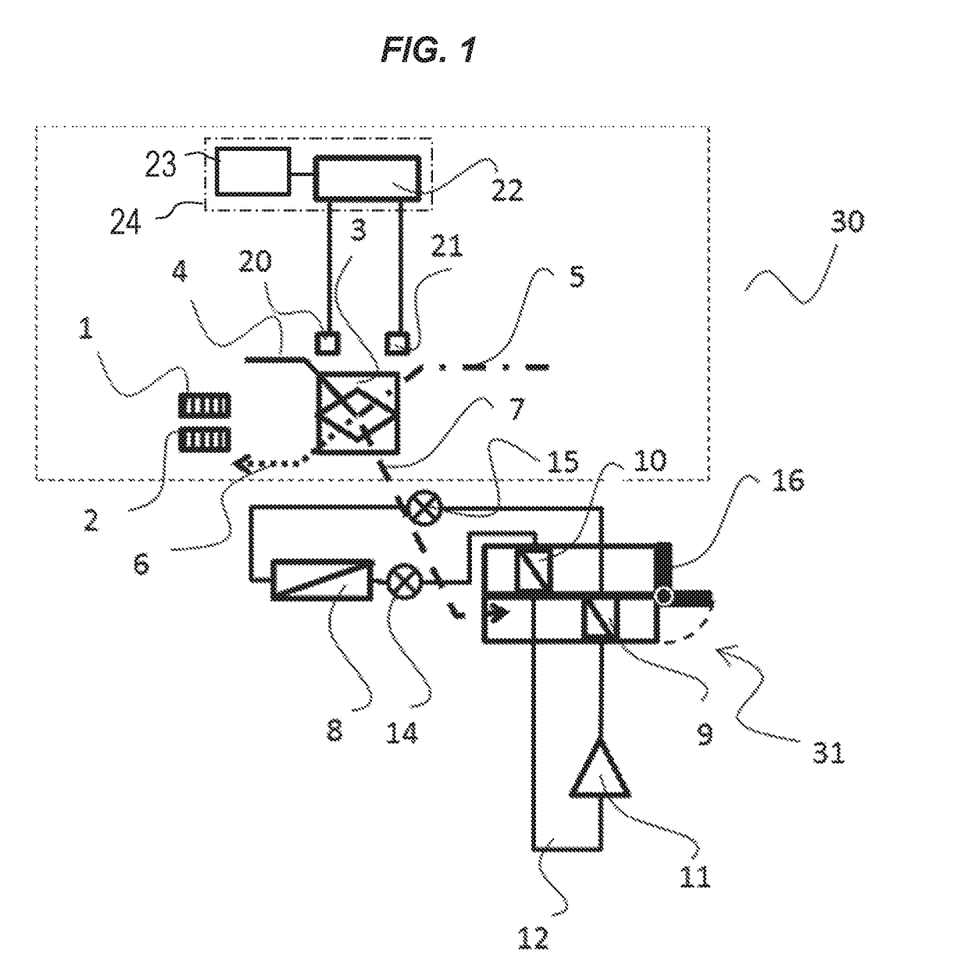
FIG. 1 is a diagram showing the first embodiment of the present application, showing an example of a system configuration in which the heat exchanger of the heat exchange system for vehicle is a total heat exchanger.

The first embodiment of the present application will be explained with reference to FIGS. 1 to 3 in the case of a first embodiment, in which the heat exchanger of the heat exchange system for vehicle is a total heat exchanger.

An air blower 1 for absorption, an air blower 2 for discharge, a temperature and humidity exchange element 3 (hereinafter referred to as "temperature and humidity exchange element 3"), that is another name for the total heat exchanger, which is a heat exchanger, an intake air 4 (outside air) outside the vehicle, an exhausted air 5 (ambient air) from inside the vehicle, an exhausted air 6 (exhaust air) to the outside the vehicle, an intake air 7 (air supply) to inside the vehicle, an exterior heat exchanger 8, an indoor condenser 9, an indoor evaporator 10, a compressor 11, a refrigerant pipe 12, an electronic expansion valves 14, 15, a heating and cooling switching valve 16, a first sensor 20 for detecting temperature and humidity or temperature outside the vehicle, a second sensor 21 for detecting temperature and humidity or temperature inside the vehicle, an operation part 22, a control unit 23, a control device 24, a duct 25, a total heat exchange unit 30 (hereinafter referred to as "total heat exchange unit 30"), which is a heat exchanger system, and a heat pump system 31 are illustrated in the FIGS. 1 and 2.

As the temperature and humidity exchange element 3 is an aerodynamic resistive body, as the air blower 1 for absorption for intaking air from outside the vehicle and supplying through the temperature and humidity exchange element 3, and the air blower 2 for discharge for exhausting the air inside the vehicle outside the vehicle through a temperature and humidity exchange element 3 are necessary, the air blower 1 for absorption and the air blower 2 for discharge consume electric energy from the battery (illustration omitted) of a vehicle such as an electric vehicle.

The temperature and humidity sensor 20 is provided to measure the temperature and humidity of the intake air 4 from outside the vehicle, and a temperature and humidity sensor 21 is provided to measure the temperature and humidity of the exhaust air 5 from inside the vehicle.

The operation part 22 is provided to calculate the total heat energy that can be recovered from the exhaust air 5 inside the vehicle to the intake air 7 inside the vehicle by the temperature and humidity exchange element 3, the size relationship between the electric energy consumed by the air blower 1 for absorption and the air blower 2 for discharge and the total heat energy that can be recovered is determined by the operation part 22 of the control device 24, the operation of the air blower 1 for absorption and the air blower 2 for discharge are controlled by the control unit 23 of the control device 24 according to the size relation.

Further, in the case of the first embodiment, the total heat exchange unit 30, which is a heat exchange system is composed of the air blower 1 for absorption, the air blower 2 for discharge, the temperature and humidity exchange element 3, which is another name for the total heat exchanger that is a heat exchanger, the first sensor 20, the second sensor 21, the operation part 22, the control unit 23, and the control device 24. In addition, the heat pump system 31 is composed of the heat exchanger 8 outside the vehicle, the condenser 9 inside the vehicle, the evaporator 10 inside the vehicle, the compressor 11, the refrigerant pipe 12, electronic expansion valves 14 and 15, and the heating and cooling switching valve 16.

The vehicle air conditioning system installed in the vehicle is composed of the total heat exchange unit 30 that exchanges temperature and humidity of the intake air 4 from outside the vehicle and the exhaust air 5 from inside the vehicle via the temperature and humidity exchange element 3, and the heat pump system 31 for air conditioning using a refrigerant.

The total heat exchange unit 30 is composed of an inlet (not shown) for introducing the outside air 4 into the vehicle, or an outlet (not shown) for intake air 6 that blows out the vehicle air in the total heat exchange unit 30 to the outside of the vehicle, the air blower 1 for absorption, the air blower 2 for discharge and the temperature and humidity exchange element 3. As it is well known, the temperature and humidity exchange element 3 is configured by stacking, for example, a spacer that separates two layers of air and a holder having a spacer function between the spacer.

Next, the basic operation of the example of the first embodiment will be described for the heating operation and the cooling operation.

First, the basic operation in the case of heating operation will be explained.

The heat exchanger for outside the vehicle 8 is a refrigerant evaporator, and has the function of evaporating the refrigerant, the condenser 9 inside the vehicle is a refrigerant condenser, and by condensing the refrigerant and dissipating the heat, it has the function of raising the temperature of the intake air 7 into the vehicle.

The air inlet 4 wherein the outside air which is dry at low temperatures passes through the temperature and humidity exchanger 3, and by intersecting the exhaust air 5 from the hot and humid inside of the vehicle, sensible heat and latent heat are exchanged. The intake air 7 from the outside air whose temperature and humidity have risen in the temperature and humidity exchanger 3 is blown into the heat pump system 31, passes through the second heat exchanger 9, and set the air conditioning to a predetermined temperature.

Next, the basic operation in the case of air-conditioning operation will be explained.

The first heat exchanger 8 is a refrigerant condenser, and has the function of dissipating heat, the evaporator 10 inside the vehicle is a refrigerant condenser, and has a function of lowering the temperature of the intake air from outside by evaporating the refrigerant and absorbing heat.

The intake air 4 wherein the outside air which is hot and humid passes through the temperature and humidity exchanger 3, and by intersecting the exhaust air 5 from the air inside of the vehicle which is dry at low temperatures, sensible heat and latent heat are exchanged. The intake air 7 from the outside air whose temperature and humidity have dropped in the temperature and humidity exchanger 3 is blown into the heat pump system 31, passes through the second heat exchanger 9, and set the air conditioning to a predetermined temperature.

The temperature is regulated by adjusting the ratio of the airflow to the condenser in vehicle or the evaporator in vehicle, by means of a heating and cooling switching valve 16.

Then, an example of a control that prevent or suppress worsening of electric costs due to the temperature and humidity difference or the temperature difference between the air outside the vehicle intaken inside the vehicle and the air inside the vehicle exhausted outside the vehicle will be explain.

Figure 2:
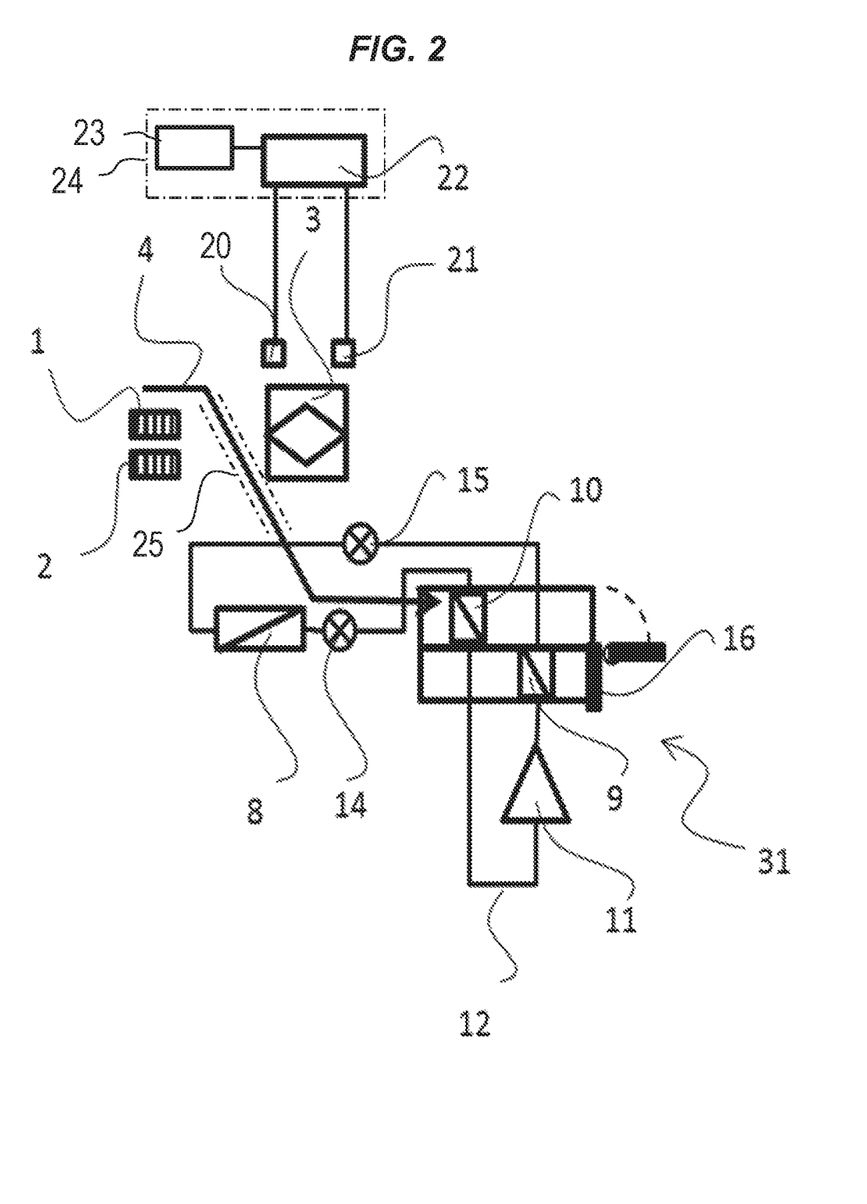
FIG. 2 is a diagram showing the first embodiment of the present application, showing an example of a system configuration in the case of the heat exchanger of the heat exchanger system for vehicle blows air from the air blower for absorption through a duct that bypasses the heat exchanger inside the vehicle of the heat pump system.
Figure 3:
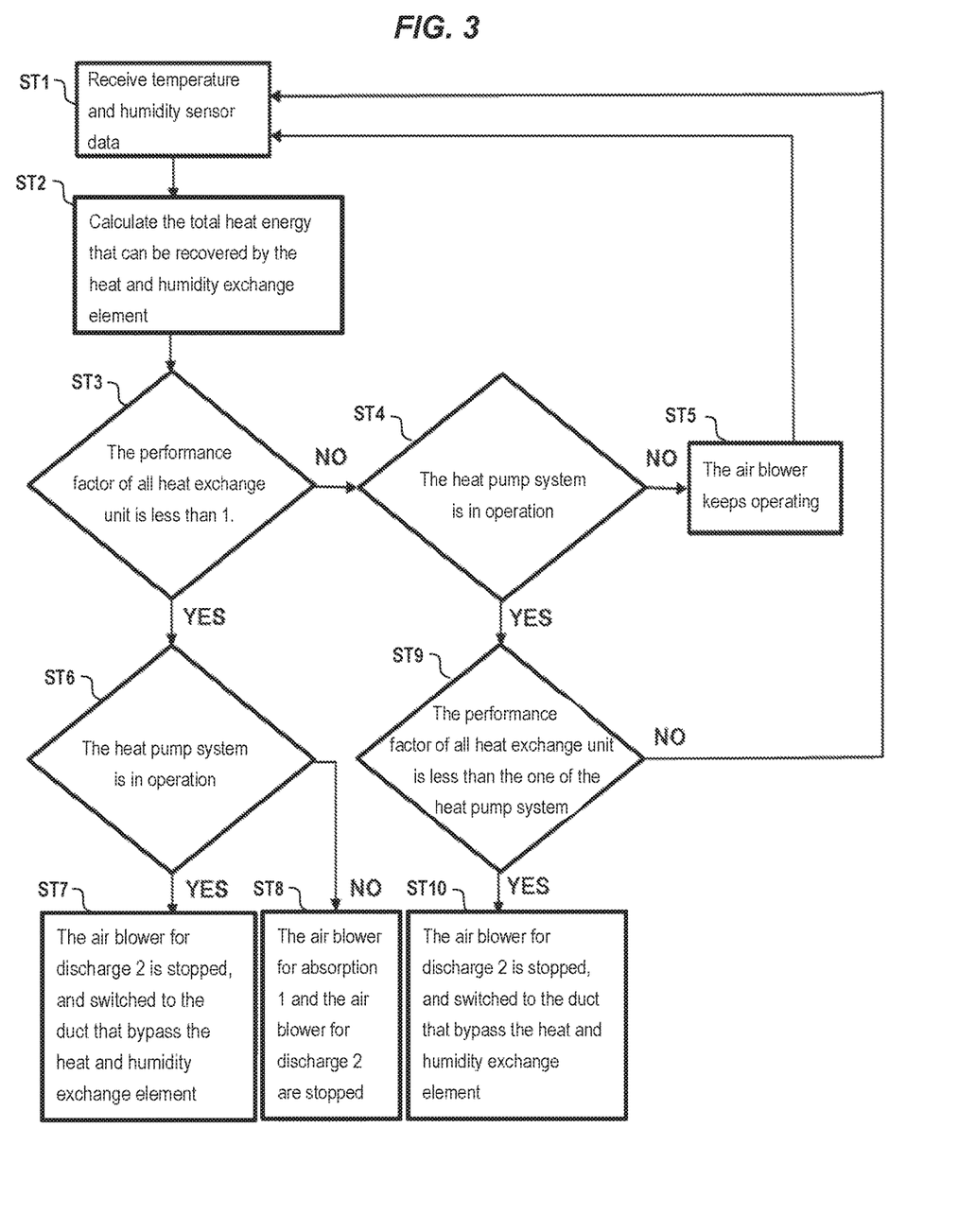
FIG. 3 is a diagram showing the first embodiment of the present application, and is an operation explanatory diagram illustrating the operation based on FIGS. 1 and 2 in a flowchart.

In FIG. 2, the total heat energy that can be recovered from the exhaust air 5 inside the vehicle to the intake air 7 inside the vehicle by the temperature and humidity exchanger 3 is calculated by the operation part, the size relationship between the electric energy consumed by the air blower 1 for absorption and the air blower 2 for discharge and the total heat energy that can be recovered and calculated by the operation part 22 is determined by the operation part 22, the operation of the air blower 1 for absorption and the air blower 2 for discharge are controlled by the control unit 23 according to the size relation determined by the operation part 22. If the total electric energy consumed by the air blower 1 for absorption and the air blower 2 for discharge is larger than the total heat energy that can be recovered by the temperature and humidity exchanger, the air blower 1 for absorption and the air blower 2 for discharge are stopped, or only the air blower 2 for discharge is stopped, the intake air 4 from outside the vehicle is blown into the heat pump system 31, bypassing the temperature and humidity exchanger 3.

The total heat energy recovered by the temperature and humidity exchanger, due to the temperature and humidity sensor 20 provided to measure the temperature and humidity of the intake air 4 from outside the vehicle, and the temperature and humidity sensor 21 is provided to measure the temperature and humidity of the exhaust air 5 from inside the vehicle, the enthalpy is calculated based on these measures, and the difference is multiplied by the temperature and humidity recovery efficiency of the temperature and humidity exchanger 3. The temperature and humidity recovery efficiency $\eta$ of the temperature and humidity exchanger 3 is the temperature and humidity exchange efficiency from the exhaust air 5 from the inside of the vehicle to the intake air 4 from the outside of the vehicle, and the definition formula is calculated by the following formula (1). The temperature and humidity exchange efficiency of the temperature and humidity exchanger 3 is a value determined by the structure of the temperature and humidity exchanger 3, and the value is stored in the memory of the operation part 22.

$$\eta=(h2-h1)/(h3-h1) \qquad \text{Formula (1)}$$

However, in formula (1), h1: enthalpy of the intake air from outside the vehicle (outside air) 4, h2: Enthalpy of the exhaust air from inside the vehicle (ambient air) 5, h3: Enthalpy of the exhaust air from inside the vehicle (ambient air) 5, The performance coefficient COP of the total heat exchange unit 30 is defined by the following formula (2).

$$COP=(V\times(h3-h1)\times\eta)/Q \qquad \text{Formula (2)}$$

However in formula (2), V: air volume, h1: enthalpy of the intake air from outside the vehicle (outside air), h3: Enthalpy of the exhaust air from inside the vehicle (ambient air) 5, $\eta$: Temperature and humidity recovery efficiency, Q: the total electric energy consumed by the air blowers 1 and 2.

If the coefficient of performance is smaller than 1, as the total heat that can be recovered for the input electric energy is small, the air blower 1 for absorption and the air blower 2 for discharge are stopped, or only the air blower 2 for discharge is stopped, and the temperature and humidity exchanger 3 is bypassed. Further, if the performance factor is higher than 1 but less than the performance factor of the heat pump system 31 comprising the refrigerant circuit, as it is more energy efficient to use a heat pump system 31 for temperature control than a total heat exchange unit for temperature control, the air blower 1 for absorption and the air blower 2 for discharge of the total heat exchange unit 30 are stopped, or the air blower 2 for discharge is stopped as illustrated in FIG. 2, the temperature and humidity exchanger 3 is bypassed and the air blower 1 for absorption blows air into the heat pump system 31 to regulate the temperature.

The performance factor of the heat pump system 31 is the heating and cooling capacity of the condenser inside the vehicle or the evaporator inside the vehicle divided by the total power consumption of the compressor 11 and the air blower 1 for absorption.

In cold climates, the discharged air in the temperature and humidity exchanger 3 may reach the dew point and the temperature and humidity exchanger 3 may freeze. When the control device 24 determines that the discharged air reaches the dew point based on the detection values of the temperature and humidity sensors 20, 21 installed inside and outside the vehicle, the air blower 1 for absorption for the intake air is stopped. By doing this, it becomes possible to control the temperature of the discharged air to be above the dew point, and the freezing of the temperature and humidity exchanger can be suppressed.

By owning a means to calculate the performance coefficient of all heat exchange units, and a means to stop the air blower 2 for discharge or to bypass the temperature and humidity exchange element 3 if the performance coefficient is low, the worsening of electric vehicle power costs can be controlled.

By controlling the discharged air so that it does not reach the dew point, the freezing of the temperature and humidity exchange element 3 can be suppressed.

The operation of the vehicle air conditioning system exemplified in FIGS. 1 and 2 will be described below using FIG. 3.

In step ST1, when the control device 24 detects the detection data of the first sensor 20 for detecting temperature and humidity outside the vehicle and the second sensor 21 for detecting temperature and humidity inside the vehicle, In step ST2, the operation part 22 calculates the total heat energy that can be recovered by the temperature and humidity exchange element 3.

In step ST3, when the control device 24 determines whether the performance factor of the total heat exchange unit 30 calculated by the operation part 22 is less than one, and when the control device 24 determines that the performance factor of the total heat exchange unit 30 calculated by the operation part 22 is not less than 1, then, in step ST4, when the control device 24 determines whether the heat pump system 31 is operating or not, and when the control device 24 determines that the heat pump system 31 doesn't operate, then, in step ST5, the control device 24 operates continually the air blower 1 for absorption and the air blower 2 for discharge.

In step ST3, when the control device 24 determines that the performance factor of the total heat exchange unit 30 calculated by the operation part 22 is less than 1, then, in step ST6, when the control device 24 determines whether the heat pump system 31 is operating or not, and when the control device 24 determines that the heat pump system 31 operates, then, in step ST7, the control device 24 stops the air blower 2 for discharge, and switch to duct 25 which bypasses the temperature and humidity exchange element 3. By this switching, the air is blown from the air blower 1 for absorption to the evaporator of the inside of the vehicle of the heat pump system 31.

In step ST6, when the control device 24 determines that the heat pump system 31 doesn't operate, then, in step ST8, the control device 24 stops the air blower 1 for absorption and the air blower 2 for discharge.

In step ST4, when the control device 24 determines that the heat pump system 31 operates, then, in step ST9, when the control device 24 determines whether the performance factor of the total heat exchange unit 30 is less than the performance factor of the heat pump system, and determines that the performance factor of the total heat exchange unit 30 is less than the performance factor of the heat pump system, then, in step ST10, the control device 24 stops the air blower 2 for discharge, and switch to duct 25 which bypasses the temperature and humidity exchange element 3. By this switching, the air is blown from the air blower 1 for absorption to the evaporator of the inside of the vehicle of the heat pump system 31.

In addition, the total heat exchange unit 30 in the present embodiment uses a temperature and humidity exchange element 3, the example is given in the case of a total heat exchange unit, which is a temperature and humidity heat exchange device that exchanges sensible heat and latent heat, but instead of the temperature and humidity exchange element 3, it can be used as a sensible heat exchanger that can recover sensible heat only.

The heat exchanger unit in which a temperature and humidity exchange element 3 is replaced by a sensible heat exchanger instead of the temperature and humidity exchange element will be described in the second embodiment. Further, the system configuration of the heat exchange system for vehicle is the same for the whole heat exchange unit and the sensible heat exchange unit. Therefore, the system configuration diagram of the second embodiment is also shown in FIG. 1 and FIG. 2, the temperature and humidity sensor in the flow operation of FIG. 3 may be read as a sensible heat sensor, the temperature and humidity exchange element as a sensible heat exchanger, and the total heat exchange unit as a sensible heat exchange unit.

With respect to the case of the second embodiment, the sensible heat exchange unit of the heat exchange system for a vehicle will be described in the case in which the total heat exchange unit is used in the first embodiment. The sensible heat exchange unit has a sensible heat exchanger that exchanges sensible heat, and the sensible heat exchanger exchanges sensible heat of the discharged air with the sensible heat of the intake air. The temperature exchanger and sensor that exchange sensible heat in a sensible heat exchange unit are less expensive than the temperature and humidity exchanger and sensor that exchange all the heat in the total heat exchange unit.

According to the temperature exchange element 3, the operation part 22 is provided to calculate the sensible heat energy that can be recovered from the exhaust air 5 inside the vehicle to the intake air 7 inside the vehicle, and the operation of the air blower 1 for absorption and the air blower 2 for discharge are controlled according to the size relationship between the electric energy consumed by the air blower 1 for absorption and the air blower 2 for discharge and the sensible heat energy that can be recovered. If the total electric energy consumed by the air blower 1 for absorption and the air blower 2 for discharge is larger than the total heat energy that can be recovered by the sensible heat exchanger, the air blower 1 for absorption and the air blower 2 for discharge are stopped, or only the air blower 2 for discharge is stopped, the air is blown from the air blower 1 for absorption to the evaporator of the inside of the vehicle 10, which is the heat exchange for inside the vehicle of the heat pump system 31 through a duct 25 bypassing the heat exchanger 3 that is the sensible heat exchanger.

The sensible heat energy recovered by the temperature exchanger has a temperature sensor 20 provided to measure the temperature of the intake air 4 from outside the vehicle, and a temperature sensor 21 is provided to measure the temperature of the exhaust air 5 from inside the vehicle, the sensible heat is calculated based on these measures, and the difference is multiplied by the temperature recovery efficiency of the temperature exchanger 3. The sensible temperature recovery efficiency $\eta$ is the temperature exchange efficiency from the exhaust air 5 from the inside of the vehicle to the intake air 4 from the outside of the vehicle, and the definition formula is calculated by the following formula (3). The temperature exchange efficiency is a value determined by the structure of the temperature exchanger, and the value is stored in the operation part 22.

$$\eta=(T2-T1)/(T3-T1) \quad \text{Formula (3)}$$

However, in formula (3), T1: Temperature of the intake air from outside the vehicle (outside air) 4, T2: Temperature of the exhaust air from inside the vehicle (ambient air) 5, T3: Temperature of the exhaust air from inside the vehicle (ambient air) 5, The performance coefficient COP of the sensible heat exchange unit is defined by the following formula (4).

$$COP=(V\times(T3-T1)\times\eta/Q \quad \text{Formula (4)}$$

However in formula (4), V: air volume, T3: temperature of the exhaust air from inside the vehicle (ambient air), T1: temperature of the intake air from inside the vehicle (outside air) 4, η: Temperature recovery efficiency, Q: the total electric energy consumed by the air blower 1 for absorption and the air blower 2 for discharge.

If the coefficient of performance is smaller than 1, as the sensible heat that can be recovered for the input electric energy is small, the air blower 1 for absorption and the air blower 2 for discharge are stopped, or only the air blower 2 for discharge is stopped, and the temperature exchanger 3 is bypassed. Further, if the performance factor is higher than 1 but less than the performance factor of the heat pump system 31 comprising the refrigerant circuit, as it is more energy efficient to use a heat pump system 31 for temperature control, the air blower 1 for absorption and the air blower 2 for discharge of the sensible heat exchange unit 30 are stopped, or the air blower 2 for discharge is stopped as illustrated in FIG. 2, the temperature exchanger 3 is bypassed in the air blower 1 for absorption, and the heat pump system 31 blows air into to regulate the temperature.

The performance factor of the heat pump system 31 is the heating capacity and the cooling capacity of the condenser inside the vehicle or the evaporator inside the vehicle divided by the total power consumption of the compressor 11 and the air blower 1 for absorption.

In the drawings, the same reference numerals indicate the same or corresponding parts.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

REFERENCE SIGNS LIST

1: Air blower for absorption,
2: Air blower for discharge,
3: Temperature and humidity exchange elements (sensible heat exchanger),
4: Intake air from outside the vehicle (outside air),
5: Exhaust air from inside the vehicle (ambient air),
6: Exhaust air from outside the vehicle (exhaust air),
7: Intake air from inside the vehicle (air supply),
8: Outdoor heat exchanger,
9: Indoor condenser,
10: Indoor evaporator,
11: Compressor,
12: Refrigerant pipe,
14, 15: Electronic expansion valve,
16: Heating and cooling switching valve,
20: First sensor for detecting temperature and humidity or temperature outside the vehicle,
21: Second sensor for detecting temperature and humidity or temperature inside the vehicle,
22: Operation part,
23: Control part,
24: Control device,
25: Duct,
30: Total heat exchange unit,
31: Heat pump system.

The invention claimed is:

1. A heat exchange system for vehicle comprising;
a heat exchanger that exchanges heat between the air inside the vehicle and the air outside the vehicle,
an air blower for absorption that intakes the air outside the vehicle inside the vehicle and feeds it to the heat exchanger,
an air blower for discharge that exhausts an air after the heat exchange between an air inside the vehicle and the air outside the vehicle, which is fed by the air blower for absorption, to the outside of the vehicle, and
a control device having a calculator calculating an energy recovered by the heat exchanger in the heat exchanger and energies consumed by the air blower for absorption and the air blower for discharge and determining which of the energy recovered by the heat exchange and the energies consumed by the air blower for absorption and the air blower for discharge is greater, and a controller stopping at least one of the air blower for absorption and the air blower for discharge so that the energy consumed by the air blower for absorption and the air blower for discharge becomes small when the calculator determines that the energy consumed by the air blower for absorption and the air blower for discharge is greater than the energy recovered by the heat exchanger.

2. The heat exchange system for vehicle according to claim 1, wherein
the heat exchange is a sensible heat exchange or a total heat exchange.

3. An air conditioning system for vehicle comprising:
the heat exchange system according to claim 1, and
a heat pump system providing air conditioning inside the vehicle, wherein;
the calculator calculates the performance factor of the heat exchange system for vehicle, and
the controller controls at least one of the air blower for absorption and the air blower for discharge so that the energy consumption of the air blower becomes small, in a case where the performance factor is less than 1, and the heat pump system is in operating state.

4. The air conditioning system for vehicle comprising:
the heat exchange system according to according to claim 1, and
a heat pump system providing air conditioning inside the vehicle, wherein;
the calculator calculates the performance factor of the heat exchange system for vehicle, and
the controller stops the air blower for absorption and the air blower for discharge in the case where the performance factor is less than 1, and the heat pump system is not in operating state.

5. The air conditioning system for vehicle comprising:
the heat exchange system according to according to claim 1, and
a heat pump system providing air conditioning inside the vehicle, wherein;
the calculator calculates the performance factor of the heat exchange system for vehicle and the performance factor of the heat pump system, and
the controller stops the air blower for discharge in the case where the heat pump system is in operating state, the performance factor of the heat exchange system for vehicle is more than 1, and is less than the performance factor of the heat pump system.

6. A heat exchange system for vehicle comprising;
a heat exchanger that exchanges heat between the air inside the vehicle and the air outside the vehicle,
an air blower for absorption that intakes the air outside the vehicle inside the vehicle and feeds it to the heat exchanger,
an air blower for discharge that exhaust the air after the heat exchange between the air outside the vehicle and the air inside the vehicle, which is fed by the air blower for absorption, to the outside of the vehicle,
a first sensor for detecting temperature and humidity or temperature outside the vehicle,
a second sensor for detecting temperature and humidity or temperature inside the vehicle, and
a control device having a calculator calculating an enthalpy that can be recovered by the heat exchanger based on the output of the first sensor and the output of the second sensor and determining whether the calculated enthalpy is smaller than the electric power consumption of the air blower for absorption and the air blower for discharge, and a controller controlling at least one of the air blower for absorption and the air blower for discharge to be stopped when the calculator that determines that the calculated enthalpy is smaller than the electric power consumption of the air blower for absorption and the air blower for discharge.

7. The heat exchange system for vehicle according to claim 6, wherein
the heat exchange is a sensible heat exchange or a total heat exchange.

8. An air conditioning system for vehicle comprising;
the heat exchange system according to claim 6, and
a heat pump system providing air conditioning inside the vehicle, wherein;
the calculator calculates the performance factor of the heat exchange system for vehicle, and
the controller controls at least one of the air blower for absorption and the air blower for discharge so that the energy consumption of the air blower becomes small, in a case where the performance factor is less than 1, and the heat pump system is in operating state.

9. The air conditioning system for vehicle comprising:
the heat exchange system according to according to claim 6, and
a heat pump system providing air conditioning inside the vehicle, wherein;
the calculator calculates the performance factor of the heat exchange system for vehicle, and
the controller stops the air blower for absorption and the air blower for discharge in the case where the performance factor is less than 1, and the heat pump system is not in operating state.

10. The air conditioning system for vehicle comprising:
the heat exchange system according to according to claim 6, and
a heat pump system providing air conditioning inside the vehicle, wherein;
the calculator calculates the performance factor of the heat exchange system for vehicle and the performance factor of the heat pump system, and
the controller stops the air blower for discharge in the case where the heat pump system is in operating state, the performance factor of the heat exchange system for vehicle is more than 1, and is less than the performance factor of the heat pump system.

* * * * *